Patented Mar. 17, 1931

1,797,192

UNITED STATES PATENT OFFICE

ALBERT J. GRACIA, OF AKRON, OHIO, ASSIGNOR TO THE GOODYEAR TIRE & RUBBER COMPANY, OF AKRON, OHIO, A CORPORATION OF OHIO

USE OF AMINES AS RUBBER COAGULANTS

No Drawing.   Application filed April 8, 1929.   Serial No. 353,681.

This invention relates to a method of compounding rubber, and it has particular relation to a method of coagulating rubber from aqueous emulsions, such as latex.

One object of the invention is to provide a method of coagulating pure or compounded latex in which the use of acid coagulates is impossible or undesirable.

An additional object of the invention is to provide a method of coagulating latex containing carbonate pigments in which the evolution of carbon dioxide is obviated.

Heretofore, in the separation of rubber from the liquid phase of latex, it has been customary to cause coagulation of the rubber by the addition of an acid, e. g., acetic acid or sulphuric acid. This method of coagulation was fairly satisfactory in most cases where the latex did not contain any pigments or other compounding ingredients which were attacked by the acid. However, in those processes in which the pigments and other compounding ingredients were added directly to the latex before the coagulation of the rubber, the method was sometimes undesirable because of chemical reactions between the pigments and the coagulant. Furthermore, it was necessary, when acid coagulants were used, to subject the coagulum to a process of extraction in order to remove the acid. This involved considerable labor and also resulted in the removal of a certain amount of the non-rubber constituents and some compounding materials.

This invention involves the discovery that amines, particularly of the type represented by the formula

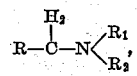

in which R is a hydrocarbon group either aliphatic or aromatic, and $R_1$ and/or $R_2$ are aliphatic hydrocarbon groups or hydrogen atoms, may effectively be used as coagulants instead of the ordinary acids heretofore employed for that purpose. The following are specific examples of aliphatic amines which have been found suitable for use as coagulants: diethylamine, ethylamine, normal propylamine, di-propylamine, tri-propylamine, normal butylamine, normal amyl amine, iso amyl amine, di-iso amyl amine, allyl amine, and benzyl amine.

All of these substances are relatively powerful coagulants. However, the derivatives of the higher hydrocarbons are observed to be more active than those of the lower compounds, such as the ethyl amines. It has also been observed that the mono-substituted amines are more powerful in their action than the di and tri substituted materials. However, all of the compounds are sufficiently active to permit of their use as commercial coagulants. The ratio of latex to amine coagulant may, of course, be varied within relatively wide limits. Satisfactory results may be obtained by using approximately 5 cc. of amine to 50 cc. of latex (latex containing 33% of rubber). These amines, because of their basic character, do not decompose the pigments which it may be desired to introduce into the latex. The coagulants being of basic nature need not be washed from the coagulum. Instead they may be left in the stock without impairing the quality of the material. In fact, the presence of some amines in the rubber is desirable because they accelerate vulcanization and act as age retarders in the finished product. Also, their use results in an excellent product which may be employed in the manufacture of substantially any of the ordinary types of rubber goods.

Although I have described only the preferred embodiments of the invention, it will be apparent to those skilled in the art that it is not so limited, but that various modifications may be made therein without departing from the spirit of the invention or from the scope of the appended claims.

What I claim is:

1. A method of treating latex which comprises introducing therein a quantity of amine selected from a group comprising ethylamine, diethylamine, normal propylamine, dipropylamine, tri-propylamine, normal butylamine, normal amyl amine, iso amyl amine, di-iso amyl amine and allyl amine sufficient to induce coagulation.

2. A method of treating latex which comprises introducing therein a quantity of an aliphatic amine sufficient to induce coagulation.

3. A method of treating latex which comprises introducing therein a pigment material and subsequently causing coagulation of the latex by treating it with an amine.

In witness whereof, I have hereunto signed my name.

Signed at Akron, in the county of Summit and State of Ohio, U. S. A., this 6th day of April, 1929.

ALBERT J. GRACIA.